United States Patent
Kobayashi

(10) Patent No.: US 8,867,138 B2
(45) Date of Patent: Oct. 21, 2014

(54) REFLECTIVE DISPLAY DEVICE

(71) Applicant: JVC Kenwood Corporation, Yokohama (JP)

(72) Inventor: Manabu Kobayashi, Yokohama (JP)

(73) Assignee: JVC Kenwood Corporation, Yokohama-shi, Kanagawa (JP)

( * ) Notice: Subject to any disclaimer, the term of this patent is extended or adjusted under 35 U.S.C. 154(b) by 0 days.

(21) Appl. No.: 13/869,607

(22) Filed: Apr. 24, 2013

(65) Prior Publication Data

US 2013/0242404 A1 Sep. 19, 2013

Related U.S. Application Data

(63) Continuation of application No. PCT/JP2012/055101, filed on Feb. 29, 2012.

(51) Int. Cl.
- *G02B 27/14* (2006.01)
- *B60K 35/00* (2006.01)
- *G02B 27/01* (2006.01)

(52) U.S. Cl.
CPC ......... *G02B 27/01* (2013.01); *B60K 2350/2052* (2013.01); *G02B 2027/0112* (2013.01); *B60K 35/00* (2013.01); *G02B 2027/0127* (2013.01); *G02B 27/0101* (2013.01)
USPC ....................................... 359/630

(58) Field of Classification Search
USPC ....................................... 359/630
See application file for complete search history.

(56) References Cited

U.S. PATENT DOCUMENTS

| | | | |
|---|---|---|---|
| 5,243,448 A * | 9/1993 | Banbury | 359/13 |
| 6,731,435 B1 * | 5/2004 | Kormos et al. | 359/630 |
| 2009/0009594 A1 * | 1/2009 | Kawai | 348/54 |
| 2009/0034087 A1 * | 2/2009 | Hung et al. | 359/630 |
| 2011/0228403 A1 * | 9/2011 | Masuda et al. | 359/630 |

FOREIGN PATENT DOCUMENTS

| | | |
|---|---|---|
| JP | 1-114430 U | 6/1989 |
| JP | 2-186319 A | 7/1990 |
| JP | 06-107036 | 4/1994 |
| JP | 6-144082 A | 5/1994 |
| JP | 2004-168230 A | 6/2004 |
| JP | 2004-170879 A | 6/2004 |
| JP | 2009-053517 A | 3/2009 |
| JP | 2009-067333 | 4/2009 |
| WO | 02/063619 A1 | 8/2002 |

OTHER PUBLICATIONS

Official Action issued in counterpart Japanese Application No. 2011-042225 dated Jul. 15, 2014, five (5) pages.

* cited by examiner

*Primary Examiner* — James Jones
(74) *Attorney, Agent, or Firm* — Nath, Goldberg & Meyer; Jerald L. Meyer; Stanley N. Protigal

(57) ABSTRACT

A concave mirror of a reflective display device, which includes a reflector, a concave mirror arranged inside of an instrument panel, a display body, a lighting device, a display control circuit, driving parameters and the like, has reflecting surfaces with different wavelength selectivities, and the reflecting surfaces are formed into reflecting surface shapes of different focal lengths. By image light reflected selectively from the concave mirror, it is possible to present virtual images in different positions to an observer.

3 Claims, 3 Drawing Sheets

REFLECTIVE DISPLAY DEVICE

CROSS REFERENCE TO RELATED APPLICATION

This application is a Continuation of PCT Application No. PCT/JP2012/055101, filed on Feb. 29, 2012, the content of which is incorporated herein by reference.

BACKGROUND

The present invention relates to a reflective display device and for example, to a reflective display device that displays driving information to a driver by a remote display using a virtual image.

As a reflective display device, a so-called head-up display device is proposed, which adopts a remote display system that minimizes a line-of-sight movement of a driver during driving.

The head-up display presents a virtual image to an observer by causing a reflector installed on a windshield or the like to reflect light from a head-up unit (projector). A head-up unit includes a light source that emits light to represent a video intended to be projected, a mirror that controls the optical path of light, and a concave lens for display on the windshield. A method for varying the distance to a virtual image viewed by an observer is described in Patent Document 1 (Japanese Patent Application Laid-Open Publication No. H06(1994)-144082) and Patent Document 2 (Japanese Patent Application Laid-Open Publication No. 2004-168230), for example.

SUMMARY

The present invention provides a reflective display device including an illuminant that emits light to present a virtual image to an observer; a reflector that reflects a display image projected from the illuminant and arranged on a windshield; and a reflection unit that is arranged between the illuminant and the reflector and has a plurality of reflecting surfaces with different wavelength selectivities for selectively reflecting light of a predetermined wavelength, wherein the plurality of reflecting surfaces of the reflection unit has reflecting surface shapes of different focal lengths, and image light of the display image is reflected from each of the plurality of reflecting surfaces and guided to the reflector, which displays the virtual images in different positions.

According to the present invention, in the reflection unit, predetermined light is reflected from a plurality of reflecting surfaces with different wavelength selectivities for selectively reflecting light of a predetermined wavelength, and thereby, it is possible to provide virtual images of different focal lengths to an observer.

According to the present invention, it is possible to vary the distance from the position of the eyes of an observer to a virtual image displayed by a vehicle display device and to display a plurality of virtual images at the same time in positions where the distances from the position of the eyes of the observer are different.

DETAILED DESCRIPTION

Figure 1:
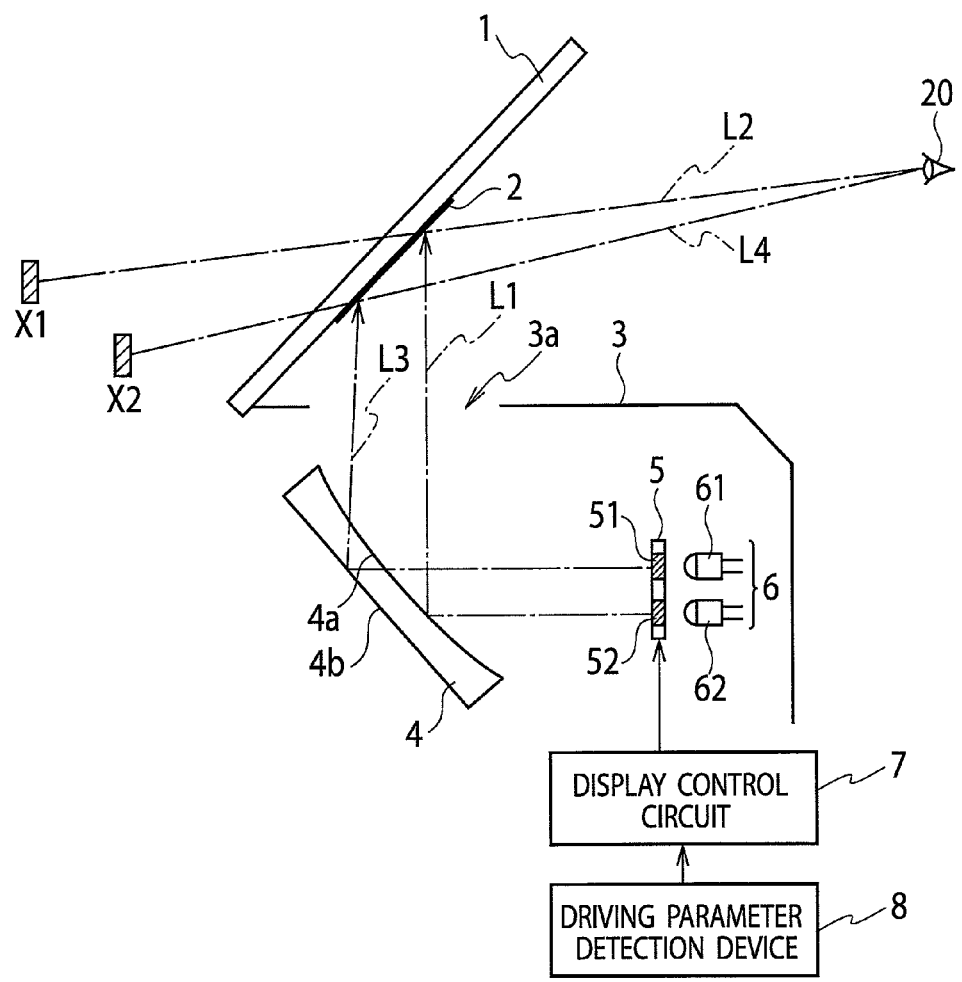
FIG. 1 is a diagram showing a block configuration that illustrates an exemplary embodiment of a reflective display device of the present invention and positions of virtual images which a driver views.

Hereinafter, an exemplary embodiment of the present invention will be described with reference to the drawings. In the following description of the drawings, the same or similar symbol is attached to the same or similar part. The drawing relating to a structure is schematic and there is a case where parts in which the relationship and ratio of dimension are different are included in the drawings.

Figure 3:
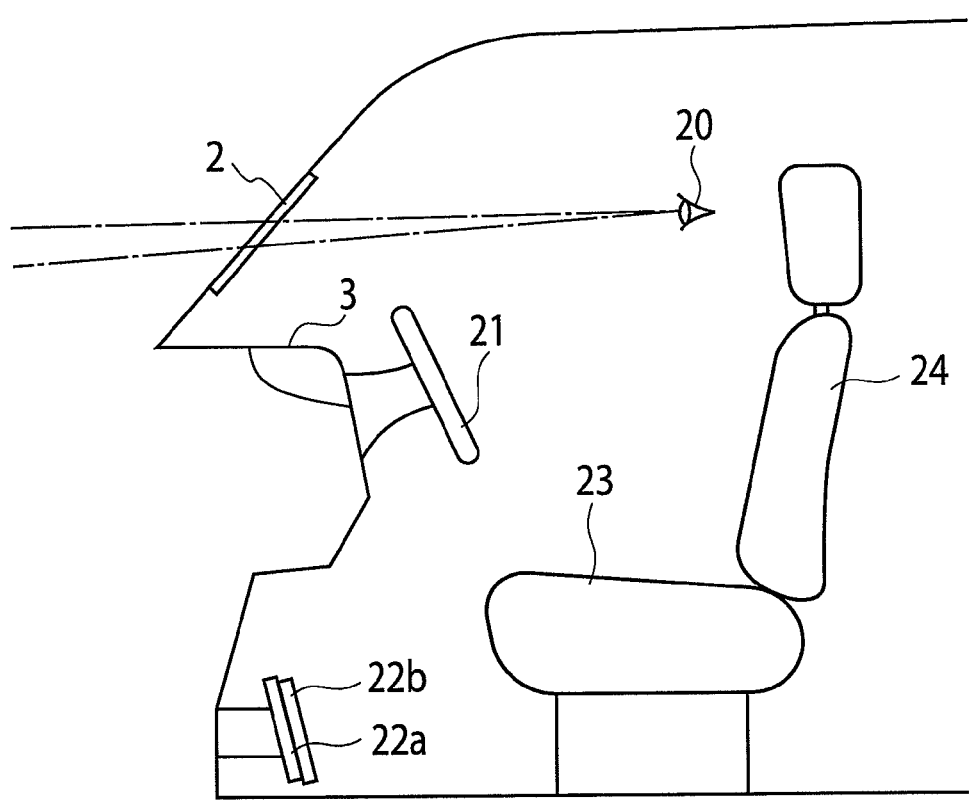
FIG. 3 is a diagram showing an outline of a driver's seat in a vehicle.

FIG. 1 shows an exemplary embodiment of a reflective display device of the present invention. The reflective display device of the present invention is a reflective display device of a head-up display system. There is shown a case where the reflective display device of the present invention is installed in a vehicle. FIG. 3 is a diagram showing an outline of a driver's seat in a vehicle. As shown in FIG. 3, the driver's seat in the vehicle includes a reflector 2 arranged on the inner surface of the windshield, an instrument panel 3, a steering wheel 21, a seat surface 23 and a backrest 24 of the driver's seat, a viewpoint 20 of a driver, a brake pedal 22a, an accelerator pedal 22b, and the like. Further, as shown in FIG. 1, within the instrument panel 3, a concave mirror 4, a display body 5, a lighting device 6, a display control circuit 7, a driving parameter detection device 8, and the like, are arranged. The configuration within the instrument panel 3 is called a head-up unit. The head-up unit may include all the configurations described above or may include only part of the configurations.

The driving parameter detection device 8 detects parameters desired to be confirmed during driving such as the speed and rotating speed during driving and the amount of remaining fuel. The display control circuit 7 controls the display body 5 installed within the instrument panel 3 and selects necessary data from among data output from the driving parameter detection device 8 and transmits the data to the display body 5, and thereby forming a display image. The display image displayed on the display body 5 is projected onto the reflector 2 via the concave mirror 4 which is a reflection unit. The reflector 2 is provided on the inside of a windshield 1 in the vehicle. The reflector 2 is called a combiner, and reflects again the reflected light from the concave mirror 4 and guides the light to the viewpoint 20 of the driver, and thereby, the driver visually recognizes virtual images X1 and X2 of the display images ahead of the windshield.

The lighting device 6 includes light sources 61 and 62, and the display body 5 and the concave mirror 4 are installed. The concave mirror 4 is arranged at predetermined angles which is inclined with respect to the image light from the display body 5 such that the image light from the display body 5 is reflected and guided to the reflector 2.

The concave mirror 4 includes a plurality of optical reflecting surfaces in a base material that transmits light, and includes a front surface 4a as a first reflecting surface and a back surface 4b as a second reflecting surface. The front surface 4a and the back surface 4b, which are boundary surfaces, function as a reflecting surface. An optical thin film, which has wavelength selectivity for selectively reflecting light of a predetermined wavelength, is formed on the front surface 4a. An optical thin film, which has wavelength selectivity for transmitting light passing through the front surface 4a and entering the back surface 4b, is formed on the back surface 4b. Alternatively, an optical thin film having the wavelength selectivity for reflecting all visible light may be formed. Because of this, it is possible to form a film that reflects all visible light on the most distant boundary surface when viewed from the display body 5, that is, the back surface 4b.

As described above, the optical thin films are formed such that the wavelength selectivity of the first reflecting surface and the wavelength selectivity of the second reflecting surface are different from each other. Further, the front surface 4a and the back surface 4b of the concave mirror 4 are both configured so as to have concave surfaces and formed such that the radii of curvature of the concave surfaces, that is, the focal lengths of the concave surfaces of the front surface 4a and the back surface 4b are different from each other with respect to incident light from the display body 5.

On the other hand, in the display body 5, display units 51 and 52 capable of displaying an image, are formed in the vertical direction. The lighting device 6 which irradiates the display body 5 with light is arranged behind the display body 5. The lighting device 6 includes the light sources 61 and 62. The light source 61 which irradiates the display unit 51 is arranged behind the display unit 51, and the light source 62 which irradiates the display unit 52 is arranged behind the display unit 52. By varying the colors of light emitted from the light sources 61 and 62, it is possible to configure the display units 51 and 52 in different display colors.

As a configuration example of display regions in different display colors, for example, the light source 62 is configured by a light emitting diode or the like that emits red light and the light source 61 is configured by a light emitting diode or the like that emits blue light. In this configuration, the display unit 52 is displayed in red and the display unit 51 is displayed in blue. In correspondence to this, the wavelength selectivity of the optical thin film formed on the front surface 4a of the concave mirror 4 is caused to have characteristics of reflecting visible light of a wavelength of 600 nm or more (red light) and of transmitting visible light of other wavelengths, for example. In this case, the image light of the display unit 52 illuminated with red light from the light source 62 of the lighting device 6 is reflected from the front surface 4a and does not reach the back surface 4b. Further, the optical thin film is formed on the front surface 4a of the concave mirror 4, and therefore, the reflectance in the reflection band is set to substantially 100% and the transmittance in the transmission band is set to substantially 100%.

The optical thin film, which totally reflects visible light, is formed on the back surface 4b of the concave mirror 4, and therefore, the image light of the display unit 51 illuminated with the blue light from the light source 61 of the lighting device 6 is reflected from the back surface 4b after passing through the front surface 4a, which selectively reflects red light, and passes through the front surface 4a again and reaches the reflector 2. Further, the optical thin film is formed on the back surface 4b of the concave mirror 4, and therefore, the reflectance is set to substantially 100% in the reflection band corresponding to the blue light from the blue light emitting diode or the like. Alternatively, even when an optical thin film having the wavelength selectivity of reflecting all visible light is formed, the reflectance is set to substantially 100% in the reflection band corresponding to the blue light from the blue light emitting diode or the like. Consequently, it is possible to suppress the attenuation of the display light in the concave mirror 4 to substantially zero.

The operation of the present embodiment will be described below. Display image data from the driving parameter detection device 8 is input to the display control circuit 7, which controls the display body 5 within the instrument panel 3 to display a display image on the display unit 51 and the display unit 52.

The image light by the display image displayed on the display units 51 and 52 reaches the front surface 4a of the concave mirror 4. As described above, the front surface 4a selectively reflects red light, and therefore, the red image light from the display unit 52 is reflected from the front surface 4a and travels toward the reflector 2. On the other hand, the blue image light from the display unit 51 is not reflected from the front surface 4a and passes through the inside of the concave mirror 4 and reaches the back surface 4b.

The blue image light is reflected from the back surface 4b and passes through the front surface 4a again and travels toward the reflector 2. The reflector 2 includes a half mirror or an optical thin film whose the characteristics of reflection/transmission are set appropriately, wherein part of the image light passes therethrough and the rest is reflected therefrom, and the reflected light reaches the viewpoint 20 of the driver.

Image light L1 reflected from the front surface 4a of the concave mirror 4 passes through an opening 3a of the instrument panel 3 and reaches the reflector 2, and reflected light L2 reflected from the reflector 2 enters the viewpoint 20 and at the same time, the display image thereof is projected as the virtual image X1 in a low position ahead thereof. That is, the display image of the display unit 52 is presented as the virtual image X1 in the position of an extension of the path of the reflected light L2 in the direction toward the front ahead of the vehicle.

The optical path distance from the viewpoint 20 to the virtual image X1 is optically determined by the optical path distance from the display body 5 to the concave mirror 4 and the focal length of the front surface 4a of the concave mirror 4. This is expressed by Mathematical expression below.

$$S = f^2/(f-B) - f + D \qquad \text{[Mathematical Expression 1]}$$

where S is an optical path distance from the viewpoint 20 to the virtual image X1 or the virtual image X2, f is a focal length of the front surface 4a or the back surface 4b of the concave mirror 4, B is an optical path distance from the display body 5 to the concave mirror 4, and D is an optical path distance from the concave mirror 4 to the viewpoint 20.

Similarly, image light L3 reflected from the back surface 4b of the concave mirror 4 passes through the opening 3a of the instrument panel 3 and reaches the reflector 2, and reflected light L4 reflected from the reflector 2 enters the viewpoint 20 and at the same time, the display image thereof is projected as the virtual image X2 in a low position ahead thereof. That is, the display image of the display unit 51 is presented as the virtual image X2 in the position of an extension of the path of the reflected light L4 in the direction toward the front ahead of the vehicle. The optical path distance from the viewpoint 20 to the virtual image X2 is optically determined by the optical path distance from the display body 5 to the concave mirror 4 and the focal length of the back surface 4b of the concave mirror 4.

As described previously, the front surface 4a and the back surface 4b are formed such that the focal lengths of the concave surfaces are different from each other, and therefore, the optical path distance from the virtual image X1 by the image light L1 and the image light L2 to the viewpoint 20 and the optical path distance from the virtual image X2 by the image light L3 and the image light L4 to the viewpoint 20 are different. Consequently, it is possible to vary the distance from the position of the eyes of the driver to the position where the virtual image is displayed, and therefore, it is possible to present a plurality of virtual images at the same time in positions where the distances from the eyes of the driver are different.

With the configuration described above, outside light passing through the reflector 2 also enters the viewpoint 20 of the driver at the same time, and therefore, it is possible for the driver to observe image information of the display body 5 together with the normal field of view ahead thereof in an overlapping manner.

Figure 2:
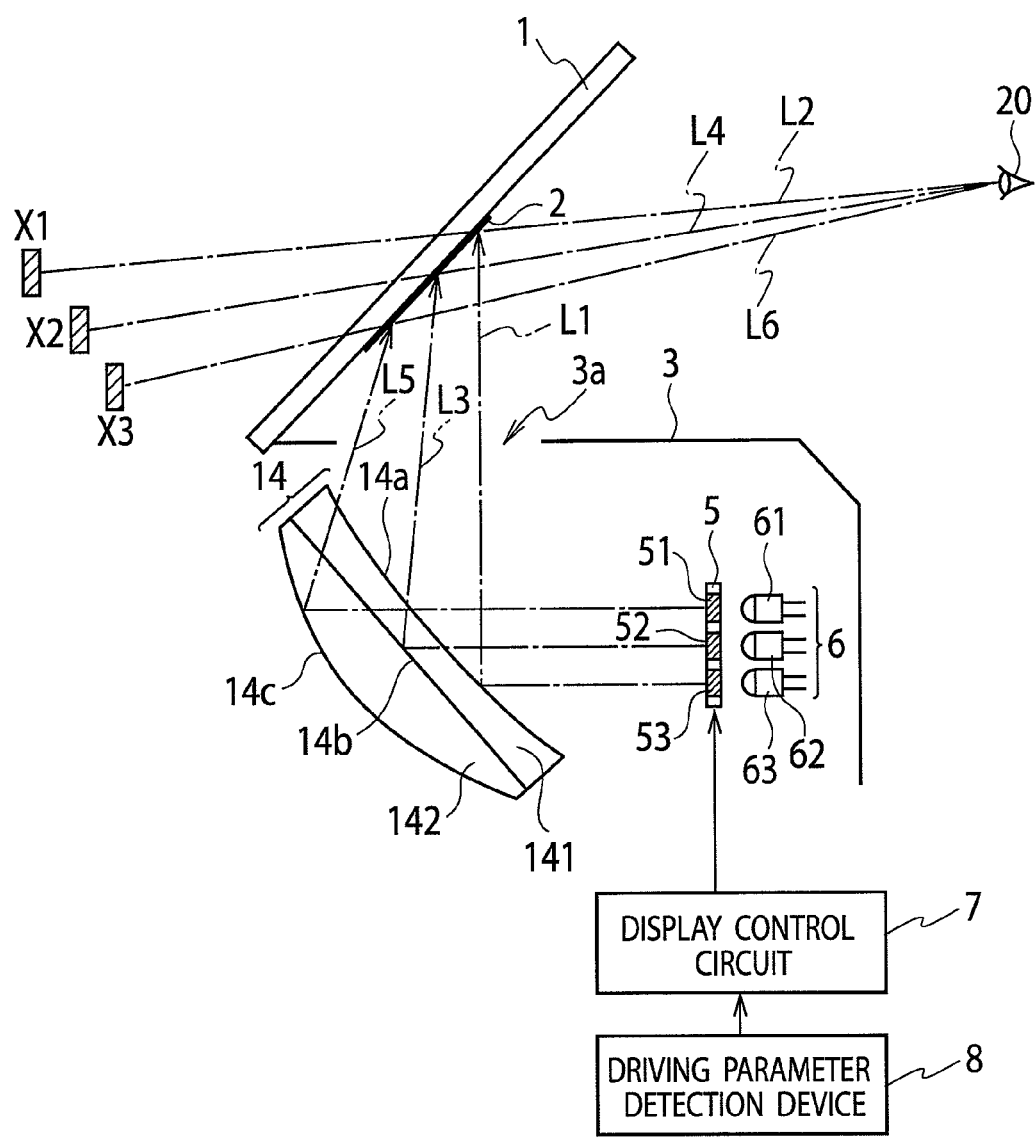
FIG. 2 is a diagram showing a block configuration that illustrates another exemplary embodiment of a reflective display device of the present invention and positions of virtual images which a driver views.

Next, another exemplary embodiment of the vehicle display device of the present invention is shown in FIG. 2. In the case of the embodiment in FIG. 2, the lighting device 6 includes three light sources, that is, the light sources 61 and 62 and a light source 63, and the display body 5 includes the display units 51 and 52 and a display unit 53. Different images, characters or the like are respectively displayed on the display units 51, 52 and 53. A concave mirror 14 includes two base materials 141 and 142 that transmit light and includes optical boundary surfaces 14a, 14b and 14c. The base material 141 and the base material 142 include materials that transmit light. Further, the optical boundary surfaces 14a, 14b and 14c are configured such that each has a concave surface and formed such that the radii of curvature of the concave surfaces, that is, the focal lengths of the concave surfaces of the boundary surfaces 14a, 14b and 14c are different from one another with respect to incident light from the display body 5.

A first optical thin film having first wavelength selectivity is applied to the reflecting surface 14a which is a first boundary surface. A second optical thin film having second wavelength selectivity is applied to the reflecting surface 14b which is a second reflecting surface. A third optical thin film having third wavelength selectivity is applied to the reflecting surface 14c which is a third reflecting surface. The third optical thin film having wavelength selectivity of reflecting all visible light may be applied. Because of this, an optical thin film having wavelength selectivity of reflecting all visible light may be formed on the reflecting surface most distant when viewed from the display body 5, that is, the reflecting surface 14c.

The wavelength selectivity of the reflecting surface 14a is caused to have characteristics of reflecting visible light having a wavelength of 600 nm or more (red light) and of transmitting visible light having other wavelengths, for example. The wavelength selectivity of the boundary surface 14b is caused to have characteristics of reflecting visible light having a wavelength between 500 nm and 600 nm (green light) and of transmitting visible light having other wavelengths, for example. In accordance with these wavelength selectivities of the reflecting surfaces 14a, 14b and 14c, for example, the light source 61 is configured by a blue light emitting diode, the light source 62 is configured by a green light emitting diode, and the light source 63 is configured by a red light emitting diode.

In this case, the image light of the display unit 53 illuminated with red light from the light source 63 is reflected from the reflecting surface 14a and does not enter the base material 141. On the other hand, the image light of the display unit 52 illuminated with green light from the light source 62 is not reflected from the reflecting surface 14a and enters the inside of the base material 141, and is reflected from the reflecting surface 14b and does not enter the inside of the base material 142. The image light of the display unit 51 illuminated with blue light from the light source 61 is not reflected from the reflecting surface 14a and the reflecting surface 14b and enters the inside of the base materials 141 and 142, and is reflected from the reflecting surface 14c. As described above, the range of wavelengths of display colors and the range of predetermined wavelengths reflected selectively from the reflecting surfaces correspond to each other, and therefore, it is possible to suppress the attenuation of the display light in the concave mirror 4 to substantially zero.

The operation of the vehicle display device of FIG. 2 will be described below. Display image data from the driving parameter detection device 8 is input to the display control circuit 7, which controls the display body 5 within the instrument panel 3 and displays a display image on the display units 51, 52 and 53.

The image light by the display image displayed on the display units 51, 52 and 53 reaches the front surface 14a of the concave mirror 14. As described above, the front surface 14a selectively reflects red light, and therefore, the red image light from the display unit 53 does not reach the reflecting surfaces 14b and 14c and is reflected from the reflecting surface 14a. The image light reflected from the reflecting surface 14a travels toward the reflector 2. On the other hand, the green image light from the display unit 52 is not reflected from the reflecting surface 14a and passes through the inside of the base material 141 of the concave mirror 14, and reaches the reflecting surface 14b and is reflected from the reflecting surface 14b. The reflected image light travels through the inside of the base material 141 and travels toward the reflector 2 after passing through the reflecting surface 14a. The blue image light from the display unit 51 is not reflected from the reflecting surfaces 14a and 14b and passes through the inside of the base materials 141 and 142 of the concave mirror 14, and reaches the reflecting surface 14c and is reflected from he reflecting surface 14c. The reflected image light travels through the inside of the base materials 142 and 141 and travels toward the reflector 2 after passing through the reflecting surfaces 14b and 14a.

The reflector 2 includes a half mirror or an optical thin film of which the characteristics of reflection/transmission are set appropriately, and part of the image light passes therethrough and the rest is reflected therefrom and the reflected light reaches the viewpoint 20 of the driver.

The image light L1 reflected from the boundary surface 14a of the concave mirror 14 passes through the opening 3a of the instrument panel 3 and reaches the reflector 2, and the reflected light L2 reflected from the reflector 2 enters the viewpoint 20 and at the same time, the display image thereof is projected as the virtual image X1 in a low position ahead thereof. That is, the display image of the display unit 53 is presented as the virtual image X1 in the position of an extension of the path of the reflected light L2 in the direction toward the front ahead of the vehicle.

Similarly, the image light L3 reflected from the boundary surface 14b of the concave mirror 14 passes through the opening 3a of the instrument panel 3 and reaches the reflector 2, and the reflected light L4 reflected from the reflector 2 enters the viewpoint 20 and at the same time, the display image thereof is projected as the virtual image X2 in a low position ahead thereof. That is, the display image of the display unit 52 is presented as the virtual image X2 in the position of an extension of the path of the reflected light L4 in the direction toward the front ahead of the vehicle.

Similarly, image light L5 reflected from the boundary surface 14c of the concave mirror 14 passes through the opening 3a of the instrument panel 3 and reaches the reflector 2, and reflected light L6 reflected from the reflector 2 enters the viewpoint 20 and at the same time, the display image thereof is projected as a virtual image X3 in a low position ahead thereof. That is, the display image of the display unit 51 is presented as the virtual image X3 in the position of an extension of the path of the reflected light L6 in the direction toward the front ahead of the vehicle.

Further, the boundary surfaces 14a, 14b and 14c are formed such that the focal length of each concave surface is different from the others, and therefore, the optical path distance from the virtual image X1 by the image light L1 and the image light L2 to the viewpoint 20, the optical path distance from the virtual image X2 by the image light L3 and the image light L4 to the viewpoint 20, and the optical path distance from the virtual image X3 by the image light L5 and the image light L6 to the viewpoint 20 are different. Consequently, it is possible to vary the distance from the position of the eyes of the driver to the position where the virtual image is displayed, and therefore, it is possible to present a plurality of virtual images at the same time in positions where the distances from the position of the eyes of the driver are different.

Further, outside light passing through the reflector 2 also enters the eyes of the driver at the same time, and therefore, it is possible for the driver to observe image information of the display body 5 together with the normal field of view ahead thereof in an overlapping manner.

In the above embodiments, the case is described where the number of display colors of the display body 5 is two or three, but, it is also possible to increase the number of colors to N. In this case, N light sources for N colors are respectively provided and arranged behind the N display units of the display body. Further, N optical boundary surfaces of the concave mirror are formed, and an optical thin film having wavelength selectivity of selectively reflecting a wavelength of a specific color is formed on each of the boundary surfaces in correspondence to the N colors. As the optical thin film having the wavelength selectivity, a total reflecting film without wavelength selectivity is formed on the reflecting surface most distant when viewed from the display body. Further, the N reflecting surfaces are formed such that the focal lengths are different from one another. With such a configuration as described above, it is possible to apply the configuration to a vehicle display device when the display body is displayed in N colors.

In the above embodiments, the case is described where the number of display units is equal to the number of reflecting surfaces in the reflection unit, but, the number of display units may be larger than the number of reflecting surfaces in the reflection unit.

In the present invention, the display control circuit 7, the display body 5, and the lighting device 6 are together called an illuminant.

What is claimed is:

1. A reflective display device comprising:
   an illuminant that emits light to present virtual images to an observer;
   a reflector that reflects display images projected from the illuminant and arranged on a windshield; and
   a reflection unit that is arranged between the illuminant and the reflector and has a plurality of reflecting surfaces with different wavelength selectivities for selectively reflecting light of a predetermined wavelength, wherein
   the plurality of reflecting surfaces of the reflection unit are a front surface and a back surface of the reflection unit,
   the front surface and the back surface have reflecting surface shapes of different focal lengths and image light of the display images is reflected from the front surface and the back surface and guided to the reflector, which displays the virtual images at the same time in positions where optical path distances differ from each other.

2. The reflective display device according to claim 1, further comprising a display unit that generates the display image, wherein the number of the display units is equal to or more than the number of the plurality of reflecting surfaces in the reflection unit.

3. The reflective display device according to claim 1, wherein the range of wavelengths of display colors and the range of predetermined wavelengths reflected selectively from the reflection unit having the plurality of reflecting surfaces correspond to each other.

* * * * *